United States Patent

Beasley

(10) Patent No.: US 9,562,491 B2
(45) Date of Patent: Feb. 7, 2017

(54) CARBON SCRAPING RING WITH ABRADABLE COATING

(75) Inventor: John Lloyd Beasley, Chicago, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 123 days.

(21) Appl. No.: 14/395,311

(22) PCT Filed: Apr. 20, 2012

(86) PCT No.: PCT/US2012/034337
§ 371 (c)(1),
(2), (4) Date: Oct. 17, 2014

(87) PCT Pub. No.: WO2013/158107
PCT Pub. Date: Oct. 24, 2013

(65) Prior Publication Data
US 2015/0114373 A1    Apr. 30, 2015

(51) Int. Cl.
*F02B 23/00* (2006.01)
*F02F 1/00* (2006.01)
*F02B 23/06* (2006.01)

(52) U.S. Cl.
CPC ............... *F02F 1/00* (2013.01); *F02B 23/00* (2013.01); *F02B 23/0603* (2013.01); *F02B 2023/0609* (2013.01); *F02B 2023/0612* (2013.01); *F02F 2001/006* (2013.01)

(58) Field of Classification Search
CPC .............. F02B 23/00; F02B 23/0603; F02B 2023/0609; F02B 2023/0612
USPC ........... 123/668, 193.6, 193.4, 193.2; 92/223
See application file for complete search history.

(56) References Cited

U.S. PATENT DOCUMENTS

| | | | | |
|---|---|---|---|---|
| 4,474,147 A | * | 10/1984 | Hoopes .................... | F02F 1/00 123/193.1 |
| 5,469,777 A | * | 11/1995 | Rao ......................... | F02F 3/105 123/193.6 |
| 5,553,585 A | * | 9/1996 | Paro ........................ | F16J 10/04 123/193.2 |
| 7,438,037 B2 | * | 10/2008 | Oogake .................... | F02F 1/004 123/193.2 |
| 2005/0279296 A1 | * | 12/2005 | Coney ..................... | F02B 77/11 123/41.84 |
| 2010/0307443 A1 | * | 12/2010 | Sand ........................ | F02F 1/18 123/193.2 |

* cited by examiner

*Primary Examiner* — Mahmoud Gimie
(74) *Attorney, Agent, or Firm* — Jack D. Nimz; Jeffrey P. Calfa

(57) ABSTRACT

A device and method for preventing and removing carbon deposit build-up on a piston/cylinder assembly of an engine, including a diesel engine, is disclosed. The device includes a cylinder having an inner sleeve for receiving a piston, a carbon scraping ring positioned on the cylinder sleeve, the carbon scraping ring including an inner surface, and an abradable coating applied to the inner surface of the carbon scraping ring providing a wearable surface between the piston and the cylinder sleeve. The abradable coating has a wearable surface, which conforms to the shape created by the movement of the piston and the cylinder sleeve and carbon scraping ring, creating a substantially zero clearance fit between the piston and the carbon scraping ring. The clearance may reduce oil consumption and improve sealing of the cylinder and piston, thereby reducing blow-by.

12 Claims, 2 Drawing Sheets

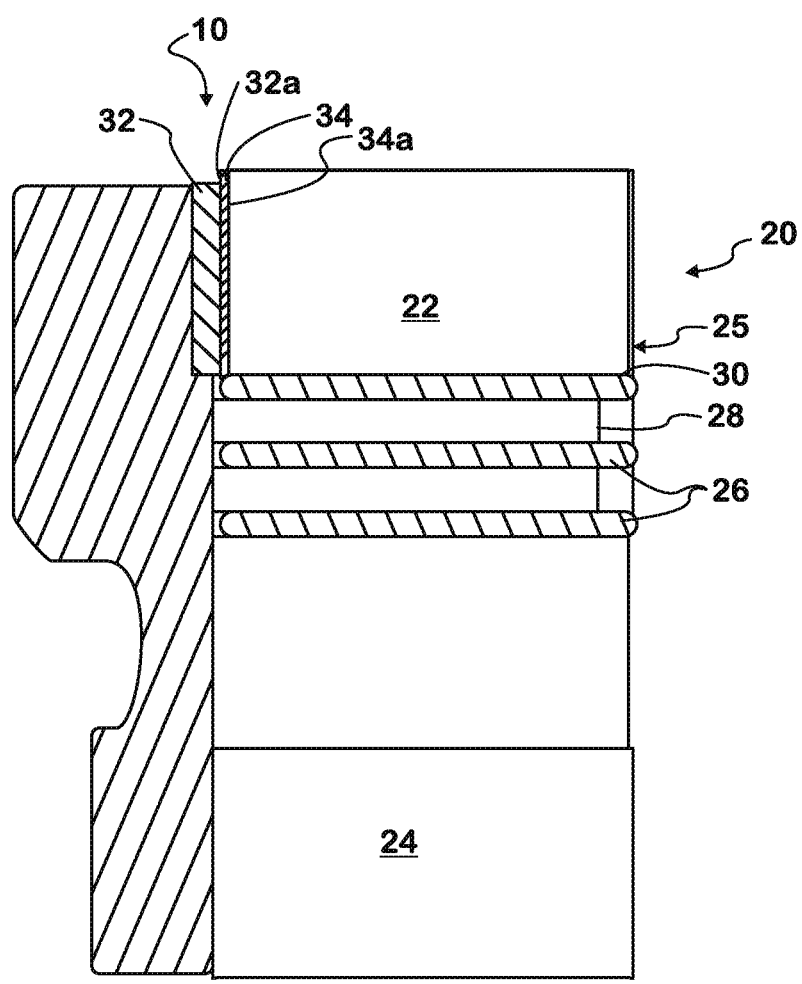

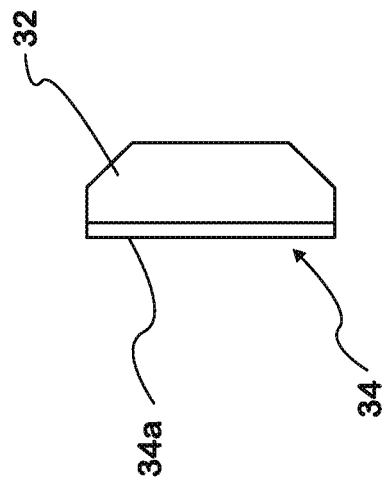
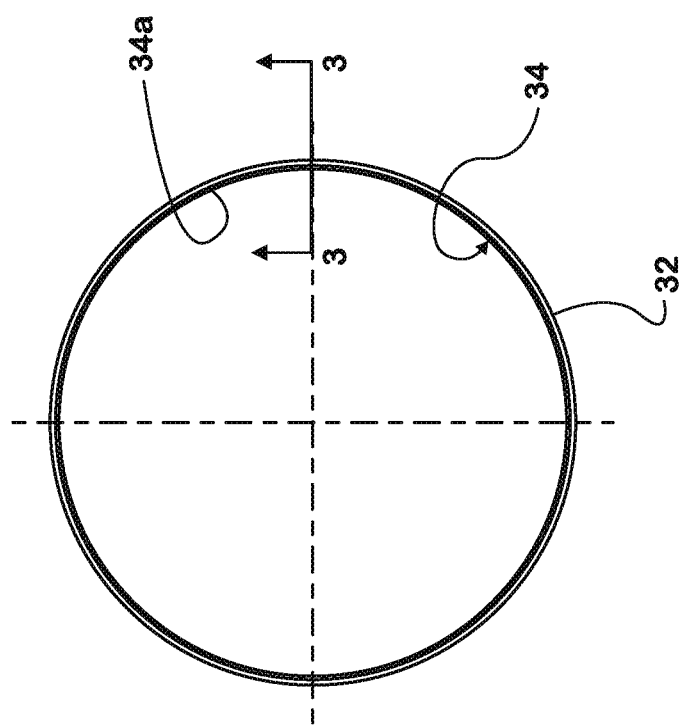

CARBON SCRAPING RING WITH ABRADABLE COATING

TECHNICAL FIELD

The present device relates to a carbon scraping ring for use in a cylinder and piston assembly of an internal combustion engine. Particularly, the device relates to a carbon scraping ring having an abradable coating for preventing and removing built-up carbon from the top of a piston while providing a close fit between the piston, the cylinder sleeve and the carbon scraping ring. The addition of the abradable coating allows each piston and cylinder sleeve to wear together for a matched set while still protecting for thermal events such as high ambient conditions and/or loss of coolant.

BACKGROUND

In an internal combustion engine, such as a diesel engine, carbon from the combustion process can build up on the land of the piston above the upper compression ring. The carbon build-up typically does not form uniformly due to dimensional variations between the piston and the cylinder sleeve, non-uniform heat distribution and secondary motion of the piston. Excessive carbon build up may lead to problems characteristic of current commercial internal combustion engine piston-cylinder assemblies, namely, excessive crevice volume, premature ring fatigue failure, and excessive blow-by of fluids or induced oil combustion. Blow-by or migration of combustion gases or fluid oil past the piston rings is a continuous problem for piston assembly design. Blow-by of combustion gases to the crank case reduces engine compression and robs the engine of its designed power. Therefore, it is necessary and desirable to prevent these potential issues, as well as, remove any carbon deposits on a regular basis.

Carbon build-up has been dealt with, for example, by increased clearance between the top land of the piston and the cylinder sleeve and reduced oil consumption through refinements in the piston and piston design rings. Additionally, a carbon scraping ring or anti-polishing ring helps to scrape the carbon that builds-up on the top land of the piston. However, the carbon scraping ring still has to provide clearance between the ring and the piston to allow for thermal expansion, deformation due to pressure load, the back and forth motion of the piston (piston secondary motion), and the non-uniform heating to the piston.

Thus, there is a need for effective prevention and removal of carbon build-up while addressing the potential issues described above. The present device provides a carbon scraping ring or anti-polishing ring having an abradable coating applied thereto. The abradable coating provides a surface that will intentionally wear to the shape created by the motion of the piston within the cylinder liner sleeve regardless of the dimensional variation in the piston and/or cylinder sleeve, as well as, any variation in operating conditions. The abradable coating reduces the clearance between the carbon scraping ring and the piston, while creating an improved fit having a substantially zero clearance between the piston and the cylinder sleeve and carbon scraping ring. The present device prevents carbon build-up and facilitates removal of carbon deposits on the top land of the piston, as well as, reduces lube oil consumption and improves the consistency of the combustion process.

SUMMARY

There is disclosed herein a device and method which avoids the disadvantages of prior devices and methods while affording additional structural and operating advantages.

Generally, the present disclosure relates to a carbon deposit prevention and removal device and assembly for use in an internal combustion engine, and specifically with a piston/cylinder combination assembly.

In an embodiment, the device comprises a cylinder having an inner sleeve for receiving a piston, a carbon scraping ring positioned on the cylinder sleeve, the carbon scraping ring including an inner surface, and, an abradable coating applied to the inner surface of the carbon scraping ring, the abradable coating providing a wearable surface between the piston and the cylinder sleeve.

In another embodiment, the wearable surface of the abradable coating has a shape determined from movement of the piston against the surface and the carbon scraping ring of the cylinder sleeve.

In yet another embodiment, the wearable surface further provides an engagement surface having substantially zero clearance between the piston and the carbon scraping ring.

A method for preventing carbon build-up on a cylinder/piston assembly is disclosed. The method comprises the steps of seating a piston within a cylinder sleeve of a cylinder, providing a carbon scraping ring having an abradable coating disposed on an inner surface thereof, positioning the carbon scraping ring on an inner diameter of the cylinder sleeve opposing the piston, and, reducing the abradable surface to a suitable thickness through movement of the piston within the cylinder sleeve.

These and other embodiments and their advantages can be more readily understood from a review of the following detailed description and the corresponding appended drawings.

BRIEF DESCRIPTION OF THE DRAWINGS

FIG. 1 is sectional view of a cylinder containing a piston and an embodiment of the carbon scraping ring device of the present disclosure;

FIG. 2 is a perspective view of the present carbon scraping ring device; and, FIG. 3 is a sectional view of the present carbon scraping ring device.

DETAILED DESCRIPTION

Referring to FIGS. 1-3, there is illustrated a carbon scraping ring device 10 useful in an internal combustion engine, including a diesel engine. The carbon scraping ring is also known as an anti-polishing ring. A typical engine (not shown) includes a block having a plurality of cylinders formed therein. A piston having a plurality of piston rings separated by lands operates within each cylinder. During operation, carbon deposits may form on the piston walls above the piston rings, which may result in a variety of potential operating issues. The present carbon scraping ring device or assembly 10 addresses the issue of prevention and removal of carbon deposit build-up, as well as, ensuring a close fit between the piston and the carbon scraping ring.

As shown in FIG. 1, a conventional piston/cylinder assembly 20 includes a three-ring aluminum alloy or steel piston 22 adapted to operate within an aluminum or cast iron cylinder 24, and specifically within the interior cylinder liner or sleeve 25. The piston body 22 comprises several ring grooves 26 that are annularly defined in the body of the piston, the ring grooves separating the interior cylinder liner walls 25 of the piston body into piston lands 28. A single annular compression ring 30 is carried within each of the top two (in case of three groove piston) or top three (in case of four groove piston) ring grooves to dynamically and adjustably maintain contact between the piston body 22 and the cylinder liner wall 25.

Positioned above the top compression ring 30, the cylinder liner or sleeve 25 is provided with a carbon scraping ring device or assembly 10. The carbon scraping ring device functions to remove carbon deposit and carbon residue that may form at the upper portion or top land of the piston 22 during operation of the engine. The carbon scraping ring device 10 of the present disclosure includes a carbon scraping ring (or anti-polishing ring) 32 having an abradable coating 34, which is applied to an inner surface of the ring.

The abradable coating 34 contains nickel graphite or compact board matrix as well as thermally conductive particles. As shown in FIGS. 2 and 3, the coating is deposited over an inner surface 32a of the carbon scraping ring 32 in a thickness at least equal, but desirably slightly in excess of any clearance between the piston 22 and the cylinder liner 25. Thickness of the abradable coating can range from about 0.4 millimeters to about 0.6 millimeters measured radially. The coating 34 is applied to the inner surface 32a side of the carbon scraping ring 32 so as to be in close or intimate contact with the piston body 22 when the piston is within the cylinder liner 25.

The abradable coating 34 has a wearable surface 34a, which is disposed next to the piston body 22. During initial engine operation, and through movement of the piston 22, the wearable surface 34a of the coating 34 will abrade and polish to a smooth surface conforming to the annulus of the piston 22. To "abrade" in the context of the present disclosure means that the coating will intentionally wear to a desired degree, thereby providing a close or intimate fit between the piston body 22 and the carbon scraping ring device 32. Abradability herein is not meant to include soft materials such as Teflon or fusible substances. The polished abraded or wearable surface 34a of the coating will have a smoothness of Ra 5 to 15 microns.

The abraded material, upon initial operation of the device, will be carried away by the oil lubricant and either removed by the oil, as a suspension, filter or be in a fine enough form to reside in the oil to provide friction reduction at any rubbing surfaces analogous to the friction reduction additives in oil. The abraded material may exit through the exhaust and may be caught in the diesel particulate filter (DPF).

Upon operation of the installed piston 22 within the cylinder sleeve 25, the coating 34 will abrade sufficiently to adapt the wearable surface 34a to a shape complementary to the cylinder sleeve 25, which results in substantially zero clearance between the piston body 22 and the carbon scraping ring 32. Thus, the shape of the wearable surface 34a can be determined, essentially "customized" for the particular piston and its corresponding cylinder sleeve such that any dimensional variations of the piston and/or cylinder sleeve, and any variations in operating conditions, are minimized. Additionally, the resulting close fit between the piston 22 and the carbon scraping ring 32, provides the following features: prevention and/or reduction of carbon build-up on the top land of the piston, a reduction in lube oil consumption, and an improvement in the consistency of the combustion process. The described carbon scraping ring and its 10 can be applied to any wet sleeve engine and does not require any change to the piston material.

A method for preventing carbon build-up in a piston/cylinder assembly for an engine is described. The method also provides for a close, precise fit for every piston and cylinder regardless of non-uniformities between them, or variations in operating conditions.

The present method includes providing a cylinder 24 having an interior sleeve 25, and seating a piston 22 within the interior sleeve 25. A carbon scraping ring 32 having an abradable coating 34 disposed on an inner surface thereof is positioned on the interior sleeve 25 of the cylinder 24, such that the abradable coating faces and is in initial contact with the piston body 22. Through natural motion of the piston within the cylinder sleeve, the abradable coating 34, and in particular, the wearable surface 34a of the coating, wears away to a thickness sufficient to provide the piston and carbon scraping ring with a close or substantially zero clearance fit between them. Thus, the abradable coating and, in particular, its wearable surface will shape to the cylinder sleeve regardless of dimensional variation in the piston body and/or cylinder sleeve and any variation in operating conditions. The method results in reduced clearance between the top compression ring and the piston allowing for: thermal expansion, deformation due to pressure load, the back and forth motion of the piston (piston secondary motion), and the non-uniform heating of the piston, while preventing carbon deposit build-up.

What is claimed is:

1. A carbon deposit removal assembly for use in an internal combustion engine, the device comprising:
   a cylinder having an inner sleeve for receiving a piston with one or more piston rings;
   a carbon scraping ring positioned on the cylinder sleeve, the carbon scraping ring including an inner surface; and,
   an abradable coating applied to the inner surface of the carbon scraping ring providing a wearable surface only between an upper portion of the piston above the one or more piston rings of the piston and the cylinder sleeve.

2. The carbon deposit removal assembly of claim 1, wherein the carbon scraping ring is supported on the inner cylinder sleeve.

3. The carbon deposit removal assembly of claim 1, wherein the abradable coating has a thickness sufficient for the wearable surface to contact the piston within the cylinder sleeve.

4. The carbon deposit removal assembly of claim 1, wherein the wearable surface of the abradable coating has a shape determined from movement of the piston against the surface and the carbon scraping ring of the cylinder sleeve.

5. The carbon deposit removal assembly of claim 4, wherein the shape of the wearable surface further provides an engagement surface between the piston and the carbon scraping ring.

6. The carbon deposit removal assembly of claim 5, wherein the engagement surface provides substantially zero clearance between the engagement surface and the piston.

7. The carbon deposit removal assembly of claim 5, wherein the engagement surface provides frictionless operation between the piston and the carbon scraping ring and cylinder sleeve.

8. The carbon deposit removal assembly of claim 1, wherein the abradable coating has an initial thickness between about 0.4 millimeters and about 0.6 millimeters measured radially.

9. A carbon deposit removal device for use in a cylinder/piston assembly of an internal combustion engine, the device comprising:
  a carbon scraping ring positioned on an interior sleeve of the cylinder, the carbon scraping ring including an inner surface facing the piston with one or more piston rings;
  an abradable coating having a sufficient thickness is applied to the inner surface of the carbon scraping ring; and,
  wherein the thickness of the abradable coating is reduced to provide an intimate fit only between an upper portion above the one or more piston rings of the piston, the interior sleeve of the cylinder and the carbon scraping ring.

10. A method for preventing carbon build-up on a piston assembly, the method comprising the steps of:
  seating a piston having one or more piston rings within a cylinder sleeve of a cylinder;
  providing a carbon scraping ring having an abradable coating disposed on an inner surface thereof;
  positioning the carbon scraping ring on an inner diameter of the cylinder sleeve opposing an upper portion above the one of more piston rings of the piston; and,
  reducing the abradable coating to a suitable thickness through movement of the piston within the cylinder sleeve.

11. The method of claim 10, wherein the method further includes creating a substantially zero clearance fit between the piston, the cylinder sleeve and the carbon scraping ring.

12. The method of claim 10, wherein the method further includes providing a frictionless operation between the piston and the cylinder sleeve.

* * * * *